United States Patent [19]

Rollo

[11] 4,331,869
[45] May 25, 1982

[54] DYNAMIC CARDIAC QUALITY ASSURANCE PHANTOM SYSTEM AND METHOD

[75] Inventor: Frank D. Rollo, Nashville, Tenn.

[73] Assignee: Capintec, Inc., Montvale, N.J.

[21] Appl. No.: 162,200

[22] Filed: Jun. 23, 1980

[51] Int. Cl.³ .................... G01D 18/00; G01T 1/20
[52] U.S. Cl. .............................. 250/252; 250/363 S
[58] Field of Search ............... 250/252, 363 R, 363 S, 250/496, 497, 505, 510; 35/17

[56] References Cited

U.S. PATENT DOCUMENTS

| 3,010,223 | 11/1961 | Alderson | 250/252 |
| 3,824,399 | 7/1974 | Björk et al. | 250/363 R |
| 4,014,109 | 3/1977 | Schramm | 250/252 |

Primary Examiner—Davis L. Willis
Attorney, Agent, or Firm—Fleit & Jacobson

[57] ABSTRACT

A dynamic phantom system and method utilizing a phantom device for simulating operation of a heart. The phantom device comprises first and second rotatable ellipsoids having first and second axes of rotation for simulating an atrium and a ventricle, respectively, of the heart, and a motor for rotating the first and second rotatable ellipsoids in unison to simulate the operation of the heart. The axes of rotation of the first and second rotatable ellipsoids are mutually perpendicular. A trigger circuit is further provided for issuing a trigger pulse in response to each rotation of the first and second rotatable ellipsoids. An attenuator is also provided for simulating ejection fraction of the heart. The dynamic phantom device is especially useful in testing camera-computer combinations employed for heart imaging and monitoring, so as to evaluate the quality of operation of the camera-computer combination.

10 Claims, 15 Drawing Figures

FIG. 1
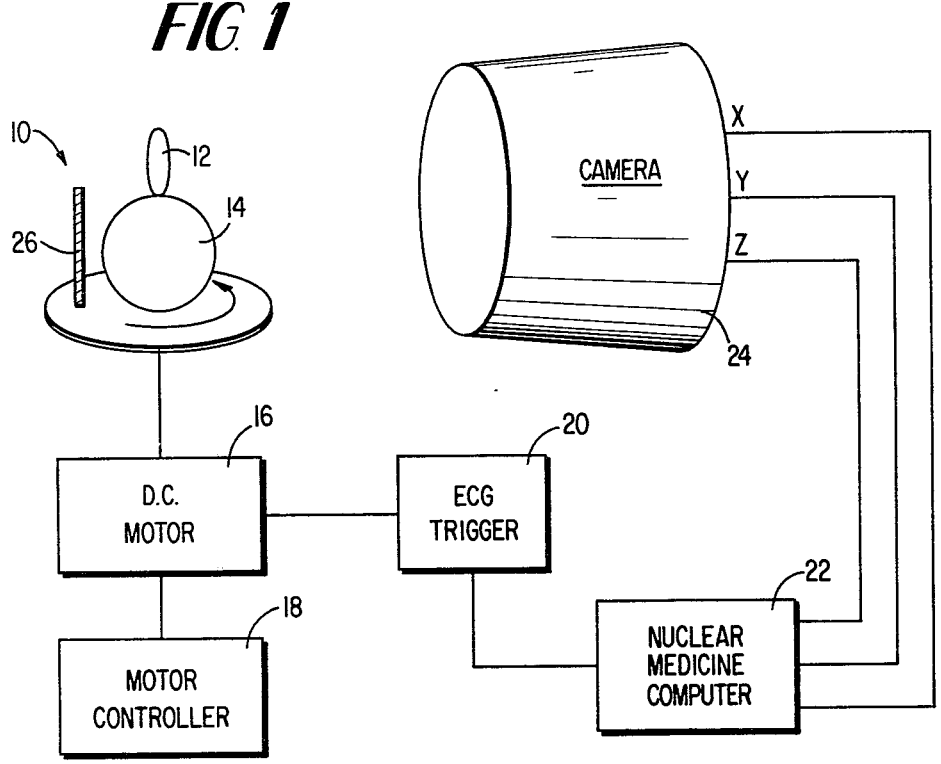
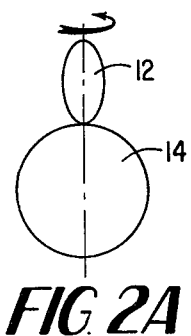
FIG. 2A
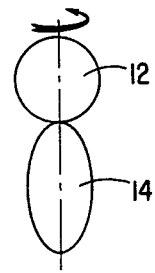
FIG. 2B
FIG. 2C
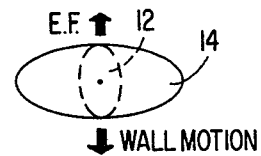

DYNAMIC CARDIAC QUALITY ASSURANCE PHANTOM SYSTEM AND METHOD

BACKGROUND OF THE INVENTION

The present invention relates to a dynamic cardiac quality assurance phantom system and method. More particularly, the invention relates to a system and method which utilizes a mechanical phantom to simulate major performance parameters of the heart, and which is accordingly useful in evaluating systems used for gated cardiac studies.

Recent developments in the field of cardiac monitoring have resulted in the employment of systems comprising the combination of a camera and a computer for employing imaging techniques to monitor and evaluate the performance of the heart of a patient. More specifically, such known systems employ a camera to view the heart of a patient so as to develop image information with respect thereto, and a computer for receiving and analyzing the image information in order to develop data relative to the major performance parameters of the heart. Such major performance parameters of the heart include the fraction of blood pumped by the left heart per beat (ejection fraction), the motion of the left heart muscle (contraction) and the variability of these two parameters as a function of heart rate. Moreover, the standard technique is rather involved.

For example, the patient is typically subjected to a cardiac catheterization procedure. Alternatively, a nuclear medicine procedure is employed in order to facilitate the monitoring and evaluation of the heart performance.

In view of the rather involved technique employed, it has been considered advantageous to carefully and continually evaluate the operability and effectiveness of the camera-computer system. That is to say, it is considered desirable to frequently perform efficient and precise evaluations of the camera-computer system in order to preclude the occurrence of faulty operation of the camera-computer system on the day that the patient is to undergo the testing procedure.

In addition, users of such camera-computer systems have a need to establish quality control techniques for evaluating their purchased system. Thus, such users have a need for a system and method for precisely evaluating the performance, operation and accuracy of the camera-computer combination.

Finally, more and more companies are developing such camera-computer systems. This results in the development of a need, among users of such systems, for a technique or system for precisely evaluating the camera-computer combination for the purpose of comparing the camera-computer system of one company with those of other companies.

SUMMARY OF THE INVENTION

Therefore, in accordance with the present invention, there is provided a dynamic cardiac quality assurance phantom device.

More particularly, a dynamic phantom device has been designed to evaluate systems (such as the camera-computer combination previously discussed) used for gated cardiac studies. In accordance with the present invention, the phantom device is mechanically simple and easy to use, and yet provides an assessment of the three major parameters of gated acquisition: heart rate, ejection fraction and wall motion. By providing a reproducible simulation of ejection fraction, and contraction (wall motion) under conditions of varying heart rate, the user of the dynamic phantom device is able to test total system performance (both hardware and software) on a daily basis. Accordingly, the dynamic phantom device is ideally suited for both quality assurance programs and comparative evaluation of gated acquisition systems.

A preferred embodiment of the dynamic phantom device employs ellipsoids of revolution, stacked one above the other with the major axis of each positioned at right angles with respect to the other, the ellipsoids of revolution forming simulated chambers for simulating the geometry of the left ventricle and left atrium, respectively, of the human heart. The ellipsoids of revolution are filled with radioactive material which generate radiation in a manner similar to the manner in which nuclear medicine techniques are employed for imaging actual human hearts. The simulated heart chambers are rotated by a variable speed D.C. motor connected thereto, the motor comprising a conventional motor, the operation of which is controlled by a conventional motor controller. An electrocardiograph (ECG) trigger circuit is connected between the D.C. motor and a conventional nuclear medicine computer, and generates a trigger pulse, provided to the computer for each rotation of the simulated chambers. In accordance with a further feature, stationary activity distributions are included for simulating background, the right heart chambers, etc.

Accordingly, it is an object of the present invention to provide a dynamic cardiac quality assurance phantom system and method.

It is an additional object of the present invention to provide a dynamic quality assurance device for gated cardiac studies, the dynamic device being designed and utilized to evaluate systems used for gated cardiac studies.

It is an additional object of the present invention to provide a dynamic phantom device which is designed to simulate geometry of the left ventricle and left atrium of the human heart.

It is an additional object of the present invention to provide a dynamic phantom device which employs ellipsoids of revolution, stacked one above the other with the major axis of each positioned at right angles with respect to each other, as simulated chambers for simulating the left ventricle and left atrium, respectively, of the human heart.

It is an additional object of the present invention to provide a dynamic phantom device including stationary activity distributions simulating background, the right heart chambers, etc.

The above and other objects which hereinafter appear, and the nature of the invention, will be more clearly understood by reference to the following description, the appended claims, and the accompanying drawings.

BRIEF DESCRIPTION OF THE DRAWINGS

FIG. 1 is a block diagram of the dynamic cardiac quality assurance phantom employed with a system used for gated cardiac studies.

FIGS. 2A through 2C are various views of the dynamic phantom device, specifically, a side view of the phantom device (FIG. 2A), a side view of the phantom device as rotated by 90° (FIG. 2B), and a top view of the phantom device (FIG. 2C).

DETAILED DESCRIPTION

The present invention will now be more fully described with reference to FIG. 1, which is a block diagram of the dynamic cardiac quality assurance phantom device, employed to evaluate a camera-computer system of the type employed for gated cardiac studies.

As seen in FIG. 1, the dynamic phantom device 10 is designed to simulate the geometry of the left ventricle and left atrium, respectively, of the human heart. The dynamic phantom device has simulated chambers, which are ellipsoids of revolution 12 and 14, respectively, stacked one above the other, with the major axis of ellipsoid 12 positioned at a right angle with respect to the major axis of ellipsoid 14.

Figure 6:
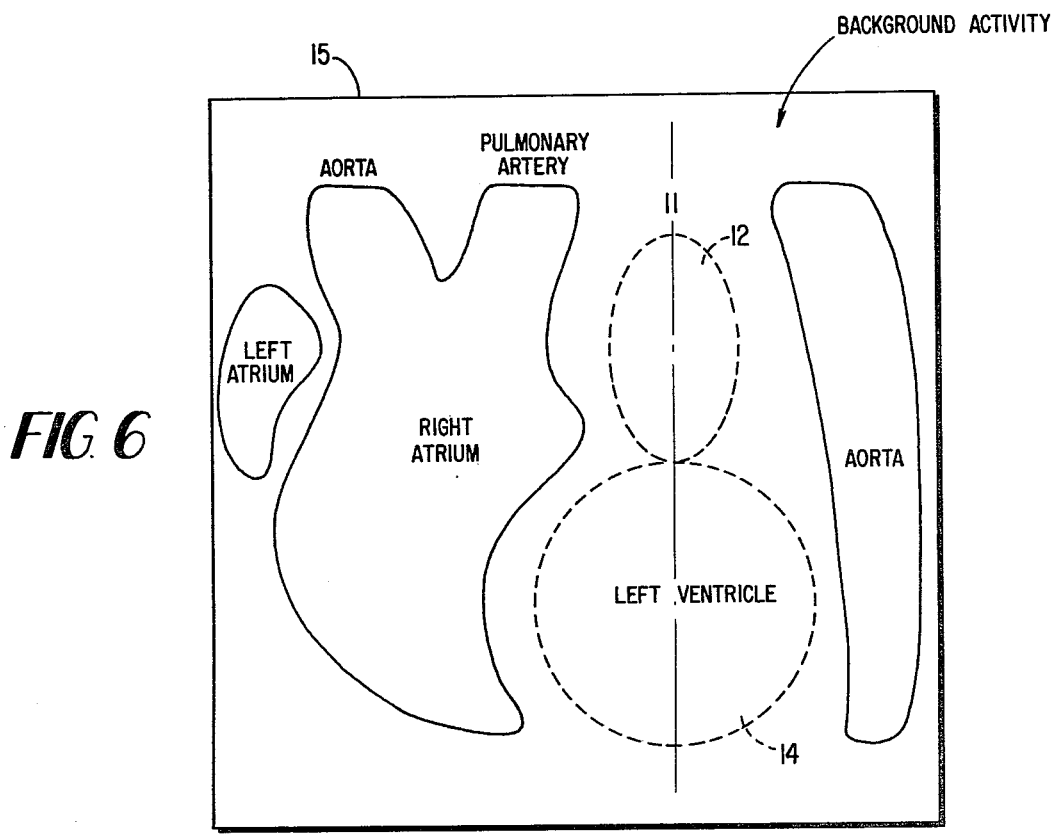
FIG. 6 is a plan view of an insert that simulates stationary activity distributions of background, the right heart chambers, and major vessels.
Figure 4A:
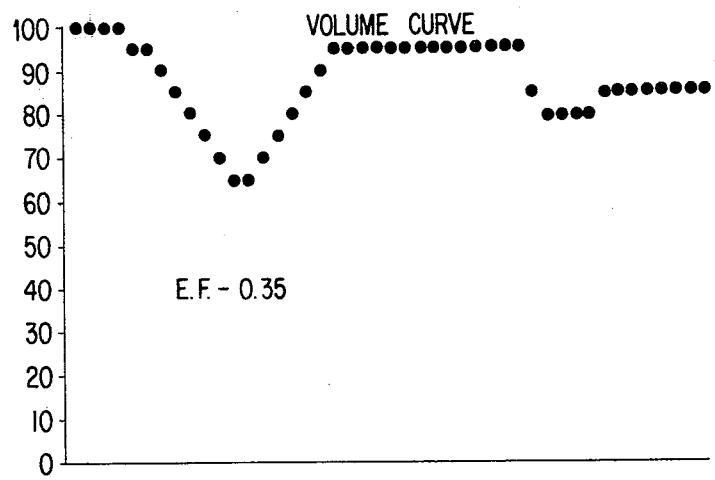
FIGS. 4a–4e includes a series of volume curves derived from utilization of the dynamic cardiac phantom device, in which ejection fraction is varied while keeping heart rate constant.
Figure 4B:
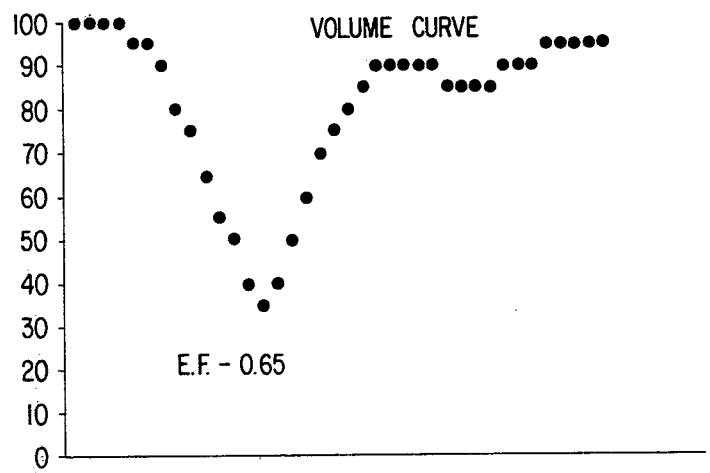
Figure 4C:
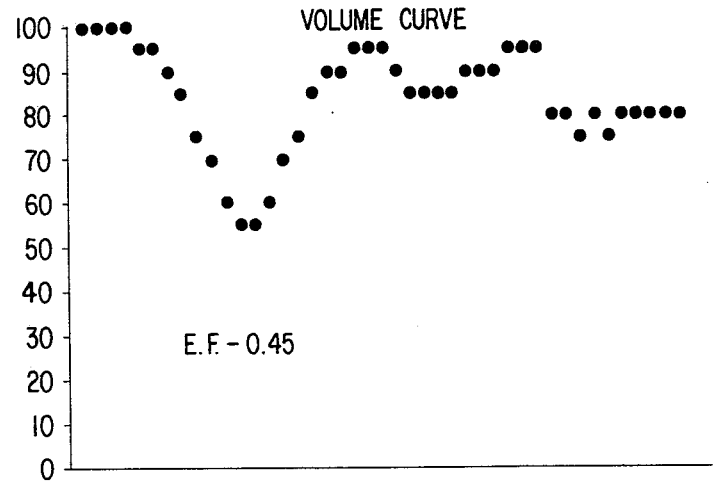
Figure 4D:
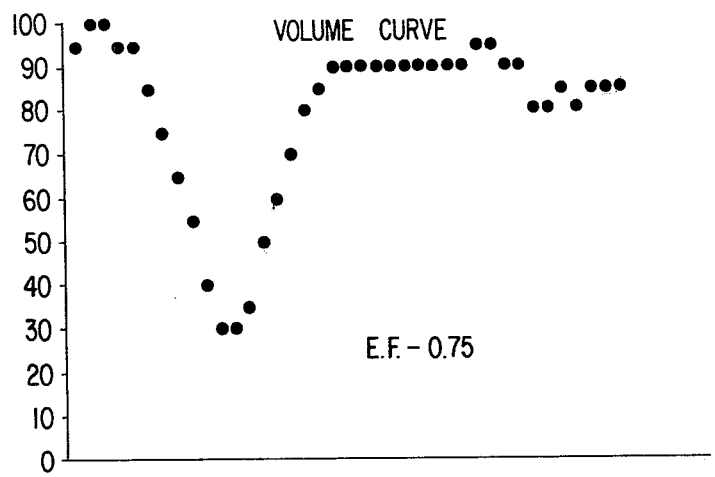
Figure 4E:
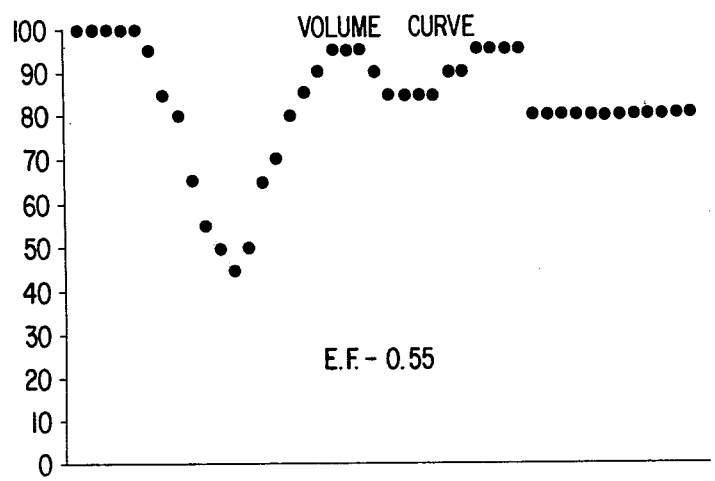
Figure 5A:
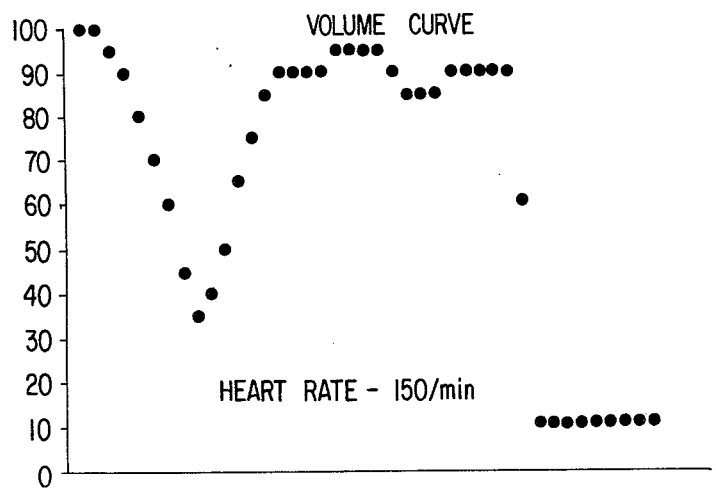
FIGS. 5a–5d is a series of volume curves derived from utilization of the dynamic phantom device, in which ejection fraction remains fixed while heart rate is varied.
Figure 5B:
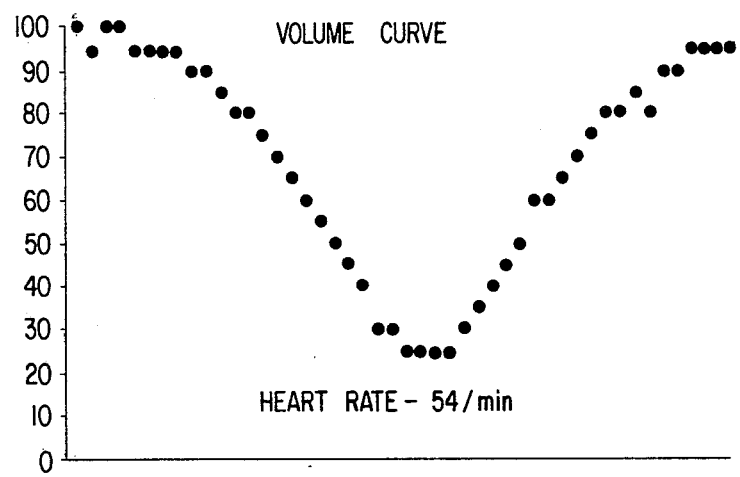
Figure 5C:
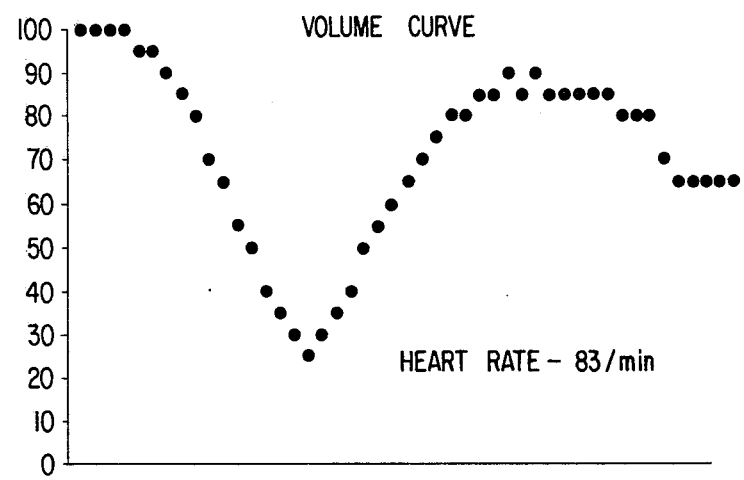
Figure 5D:
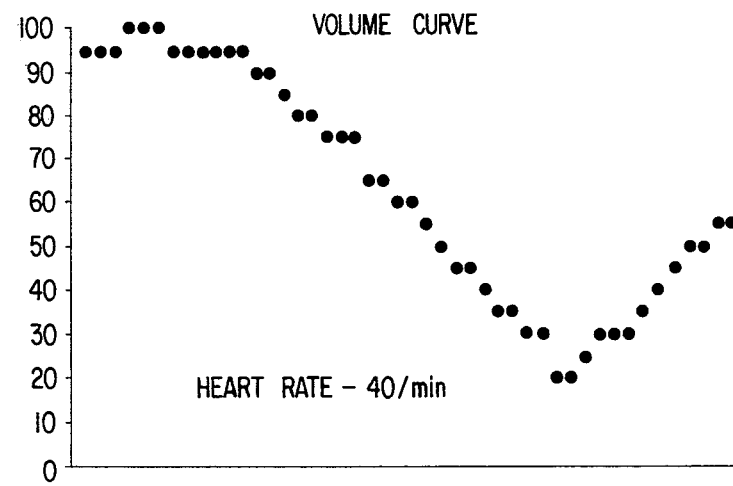

An insert 15, as illustrated in FIG. 6, is preferably positioned between the ellipsoids 12, 14 and a camera 24. The insert has chambers formed therein that represent stationary activity distributions of background, the right heart chambers and major vessels. Preferably, the chambers are filled with the same substances filling the ellipsoids.

As thus arranged, the phantom device 10 is connected to a D.C. motor 16 which rotates the phantom device by a variable speed, this variable speed being adjustable to provide a variable heart rate ranging from approximately 20 to 300 beats per minute. That is to say, the rate of rotation of the ellipsoids 12 and 14 of the device 10 corresponds to a simulated heart rate of given amount.

FIGS. 2A, 2B and 2C are various views of the ellipsoids 12 and 14 of the device 10. Specifically, FIG. 2A is a side view of the ellipsoids 12 and 14; FIG. 2B is a side view of the ellipsoids 12 and 14, when rotated through 90° with respect to the position of FIG. 2A; and FIG. 2C is a top view of the ellipsoids 12 and 14 of the device 10. Thus, as can be seen from FIGS. 2A and 2B, the phantom device 10, when rotated and imaged (viewed) from the side, exhibits wall motion corresponding to simulated wall motion of the left atrium and left ventricle, respectively, of the human heart. In this manner, the simulated wall motion is known exactly from the geometry of the ellipsoids 12 and 14, and is provided in terms of millimeters of displacement from the end-systolic state. Moreover, since the ellipsoids 12 and 14 are at right angles, the atrium and ventricle will appear to beat with the proper phase, that is, atria systole at ventricular diastole.

Referring to FIG. 2C, the top view of the ellipsoids 12 and 14, directions of ejection fraction and wall motion, respectively, are indicated by corresponding arrows labeled "E.F." and "WALL MOTION", respectively; however, instead of moving the camera, an electronic circuit actuated by a switch can be used to simulate movement of the camera with respect to the phantom device 10.

Figure 3:
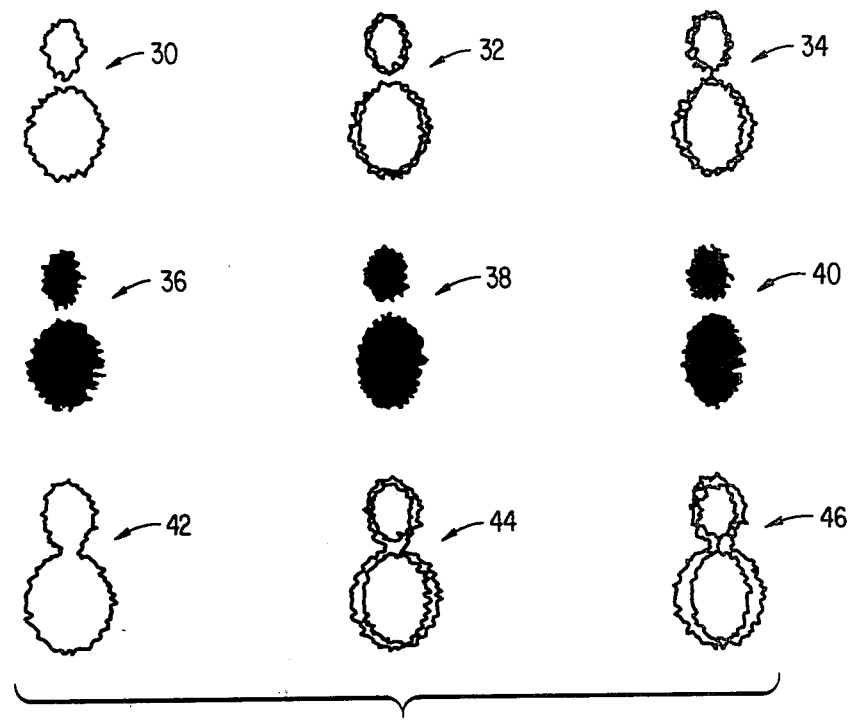
FIG. 3 is a graphical illustration of a series of digital wall motion outline images illustrating apparent wall motion of a heart.

FIG. 3 includes a series of digital wall motion outline images illustrating apparent wall motion, as simulated by the phantom device 10 of FIG. 1. Specifically, images 30, 32 and 34 indicate the radioactivity generated by the radioactive substances inside the ellipsoids 12 and 14 (FIG. 1). Images 36, 38 and 40 are computer-generated images of the ellipsoids 12 and 14, respectively, themselves. Finally, images 42, 44 and 46 are images of the radioactivity generated by the radioactive substances in the ellipsoids 12 and 14, respectively, such radioactive images representing the end-diastole state of the simulated heart.

Returning to FIG. 1, the present invention is seen to comprise a trigger circuit 20 between the motor 16 and the computer 22. The trigger circuit 20 is, for example, a monostable multivibrator connected to a switch (not shown) associated with the motor 16, the switch being associated with a cam (also not shown) associated with the motor 16. In operation, as the motor 16 rotatably drives the ellipsoids 12 and 14, the cam in the motor 16 trips the switch located therein upon each rotation of the ellipsoids 12 and 14. This tripping of the switch in the motor 16 causes triggering of the trigger circuit 20 (a monostable multivibrator), and the trigger circuit 20 issues a trigger pulse to the computer 22. Thus, the computer 22 is apprised of each rotation of ellipsoids 12 and 14.

Whereas this embodiment has been described in terms of a cam and switch (not shown) associated with the motor 16, operating to trigger a trigger circuit (monostable multivibrator) 20, it is to be understood that any other means for triggering the trigger circuit 20 can be utilized, as would be obvious to one of skill in the art.

As also seen in FIG. 1, a calibrated attenuator 26 is provided with the device 10, and it is through use of this calibrated attenuator 26 that variable ejection fraction of the heart is achieved or simulated. The calibrated attenuator 26 is positioned on the systole side of the device 10 and rotates with the ellipsoids 12 and 14. Moreover, a set of calibrated attenuators 26 is provided having thicknesses between approximately 0.2 and 3.0 mils of lead preferably supported by a plastic support having a contour corresponding to the contour of the ellipsoid 14 this yields ejection fractions within the range of 10 to 90%. Moreover, these ejection fraction attenuators are easily changed, the attenuators being held in place by a simple technique, for example, a single nylon thumbscrew.

To summarize, as a result of its composition and operation, the phantom device 10 is able to provide known wall motion or known ejection fraction, as a function of heart rate, of a simulated heart.

Further referring to FIG. 1, the motor 16 and motor controller 18 associated with the device 10 may be any conventional motor and motor controller, for example, a Cole-Parmer Universal Electric Generator Motor, or any similar motor and controller. As previously mentioned, the ECG trigger 20 can be implemented by a monostable multivibrator, or similar device. The attenuator 26 can be implemented by a piece of lead having a thickness, corresponding to desired ejection fraction, for attenuating photons emitted by the radioactive substance within the ellipsoids 12 and 14.

Further referring to the motor 16 and controller 18, they operate on a standard 110 VAC supply, the rate of rotation being controlled by a speed adjustment control on the front panel of the motor controller 18. A coaxial cable supplies a standard TTL logic signal from the trigger 20 to the computer 22, and the computer 22 utilizes that signal to synchronize image acquisition with rotation of the ellipsoids 12 and 14. This cable is, for example, connected to the physiological trigger input of the computer 22, as is conventionally provided in such systems.

In a preferred embodiment, the volume of the ellipsoids 12 and 14 is 40 ml and 120 ml, respectively. Moreover, the radioisotope to be utilized in the ellipsoids 12 and 14 should be mixed to a desired concentration of approximately 4 micro-Ci/ml before filling the ellipsoids 12 and 14.

For the purpose of ejection fraction determinations, an appropriate attenuator 26 should be selected and positioned next to the ellipsoid 14, using the nylon thumbscrew (not shown). Referring to FIG. 2C, it is to be noted that one side of the device 10 is designated "E.F." and the other side is designated "WALL MOTION". For ejection fraction determinations, the "E.F." side of the device 10 should be placed next to the scintillation camera 24. After the phantom device 10 has been filled and positioned, and the ECG trigger has been connected to the computer 22, the motor 16 is turned on and a desired heart rate (rotational speed of ellipsoids 12 and 14) is selected. Alternatively, the previously described electronic circuit can be used to eliminate the need to move the camera. A suitable system for eliminating camera movement utilizes two cams positioned 180° apart. With a switch of the electronic circuit in a first positon, a first of the cams is positioned to actuate the wall motion measuring circuit, and with the switch in a second position, the other cam is positioned to actuate the ejection fraction measuring circuit.

The image acquisition and data analysis follows exactly the same protocol as if a patient's heart were itself being examined and studied by the camera 24 and the computer 22. Any camera 24, similar to the Ohio Nuclear Portable Camera (for example), may be employed in the system. The computer 22 is preferably implemented by a Digital Equipment Corporation GAMMA-11, or similar computer, programmed as is known in the art to perform conventional cardiac imaging functions and procedures.

FIGS. 4 and 5 are graphical representations of test results, as typically derived from operation of the phantom device 10 and associated equipment of FIG. 1. In these graphical representations, volume of blood pumped by the heart is plotted on the ordinate, while time is plotted on the abscissa. FIG. 4 consists of graphical representations derived from studies in which the ejection fraction was varied while the heart rate was kept constant. Conversely, FIG. 5 consists of graphical representations derived from a series of studies in which the ejection fraction was maintained constant while the heart rate was varied.

Finally, in operation of the invention device and associated equipment, wall motion determinations may be carried out in a manner similar to the above description for ejection fraction determination.

While preferred forms and arrangements have been shown and illustrated in the invention, it is to be clearly understood that various changes in detail and arrangement may be made without departing from the spirit and scope of this disclosure.

What is claimed is:

1. A dynamic phantom device for simulating operation of a heart, comprising:
    a first rotatable ellipsoid having a first axis of rotation for simulating an atrium of the heart,
    a second rotatable ellipsoid vertically disposed with respect to said first rotatable ellipsoid and having a second axis of rotation perpendicular to the first axis of rotation for simulating a ventricle of the heart, and
    motor means for rotating said first and second rotatable ellipsoids in unison to simulate the operation of the heart.

2. The device of claim 1, wherein said motor means comprises a D.C. motor, further comprising trigger means connected to said D.C. motor and responsive to each rotation of said first and second rotatable ellipsoids for issuing a trigger pulse.

3. The device of claim 1, wherein said first and second rotatable ellipsoids are filled with radioactive material generating radiation, further comprising attenuator means adjacent to at least one of said first and second rotatable ellipsoids for attenuating said generated radiation so as to simulate ejection fraction of said heart.

4. A dynamic cardiac quality assurance phantom system for measuring the quality of operation of a heart monitoring system which includes a camera and a computer connected thereto, said system comprising a dynamic phantom device as recited in claim 1.

5. The system of claim 4, wherein said motor means comprises a D.C. motor, further comprising trigger means connected to said D.C. motor and responsive to each rotation of said first and second rotatable ellipsoids for issuing a trigger pulse.

6. The system of claim 4, wherein said first and second rotatable ellipsoids are filled with radioactive material generating radiation, further comprising attenuator means adjacent to at least one of said first and second rotatable ellipsoids for attenuating said generated radiation so as to simulate ejection fraction of said heart.

7. A method for simulating operation of a heart, comprising the steps of:
    providing first and second rotatable ellipsoids having respective first and second axes of rotation for simulating an atrium and a ventricle, respectively, of the heart, said first and second axes of rotation being mutually perpendicular; and
    rotating said first and second rotatable ellipsoids in unison to simulate the operation of the heart.

8. The method claim 7, further comprising the step of generating a trigger pulse with each rotation of the first and second rotatable ellipsoids.

9. The method of claim 7, further comprising the step of filling the first and second rotatable ellipsoids with radioactive material generating radiation, providing an attenuator adjacent to at least one of said first and second rotatable ellipsoids for attenuating said generated radiation so as to simulate ejection fraction of said heart.

10. The method of claim 7, further comprising the step of providing a camera and a computer connected thereto for scanning the simulated operation of the heart, whereby to perform dynamic cardiac quality assurance with respect to said camera and said computer connected thereto.

* * * * *